(12) United States Patent
Schulte-Eversum

(10) Patent No.: US 12,464,618 B2
(45) Date of Patent: Nov. 4, 2025

(54) ARRANGEMENT INCLUDING AN LED PIXEL MATRIX WITH LEDS CONNECTED ANTI-PARALLEL AND A DRIVER CIRCUIT FOR CONTROLLING THE LED PIXELS

(71) Applicant: HELLA GMBH & CO. KGAA, Lippstadt (DE)

(72) Inventor: Bernd Schulte-Eversum, Geseke (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 87 days.

(21) Appl. No.: 18/641,682

(22) Filed: Apr. 22, 2024

(65) Prior Publication Data

US 2024/0365451 A1 Oct. 31, 2024

(30) Foreign Application Priority Data

Apr. 27, 2023 (DE) .......................... 102023110928.6

(51) Int. Cl.
*H05B 45/42* (2020.01)
*H05B 45/30* (2020.01)

(52) U.S. Cl.
CPC ............. *H05B 45/42* (2020.01); *H05B 45/30* (2020.01)

(58) Field of Classification Search
CPC ........... G09G 3/32; H05B 45/30; H05B 45/42
See application file for complete search history.

(56) References Cited

U.S. PATENT DOCUMENTS

| | | | | |
|---|---|---|---|---|
| 4,321,598 | A * | 3/1982 | Warner | G09F 9/33 345/82 |
| 4,484,105 | A | 11/1984 | Kriete et al. | |
| 2007/0013620 | A1* | 1/2007 | Tanahashi | G09G 3/342 345/82 |
| 2008/0048567 | A1* | 2/2008 | Steele | H04N 1/40056 315/151 |
| 2014/0361696 | A1 | 12/2014 | Siessegger et al. | |
| 2016/0128152 | A1* | 5/2016 | Shinba | H05B 45/39 315/294 |

FOREIGN PATENT DOCUMENTS

AT 15265 U1 4/2017
DE 102011077445 A1 12/2012

* cited by examiner

*Primary Examiner* — Patrick C Chen
(74) *Attorney, Agent, or Firm* — WARNER NORCROSS + JUDD LLP

(57) ABSTRACT

The invention relates to an arrangement including an LED pixel matrix and a driver circuit for controlling the LED pixel matrix, wherein each LED pixel is formed from a dipole made up of two LEDs connected anti-parallel. The LED pixel matrix includes at least one row and multiple columns of the dipoles forming the LED pixel, and the dipoles are connected with a first connection to a shared line. The shared line is connected to a node between a second connection of a first controllable switch assigned to the rows and to a first connection of a second controllable switch assigned to the row. A first connection of the first switch assigned to the row is connected to a first connection of the arrangement, and a second connection of the second switch assigned to the row is connected to a second connection of the arrangement.

11 Claims, 1 Drawing Sheet

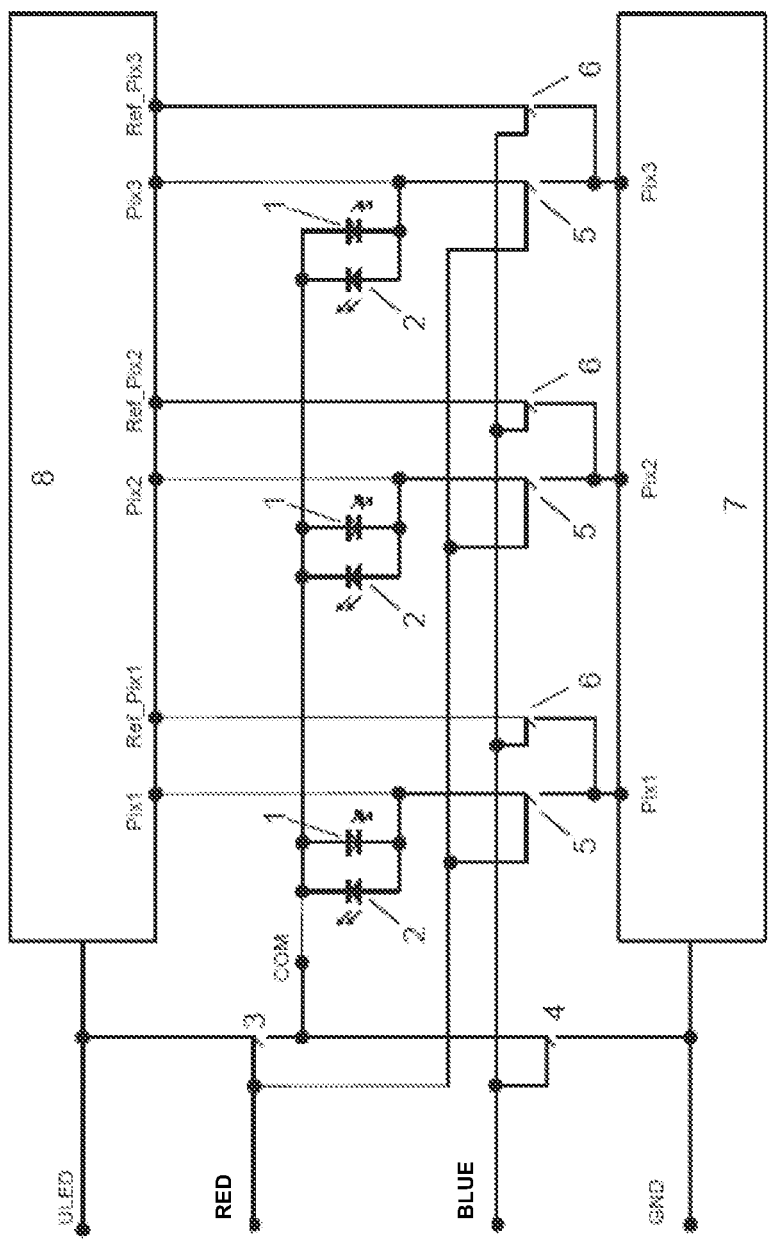

ARRANGEMENT INCLUDING AN LED PIXEL MATRIX WITH LEDS CONNECTED ANTI-PARALLEL AND A DRIVER CIRCUIT FOR CONTROLLING THE LED PIXELS

CROSS-REFERENCE TO RELATED APPLICATIONS

The present application claims the benefit of German Patent Application No. 10-2023-110-928.6, filed Apr. 27, 2023, the disclosure of which is incorporated by reference.

BACKGROUND OF THE INVENTION

The invention relates to an arrangement including an LED pixel matrix with LEDs connected anti-parallel and a driver circuit for controlling the LED pixels.

Such arrangements are known for example from the documents U.S. Pat. No. 4,321,598A or AT15265U1. Such arrangements may be used to generate different light in the pixels by means of the LEDs connected anti-parallel, for example, light with different colors. For this purpose, the LEDs in one pixel may differ. The document AT15265U1 discloses, for example, pixels with two LEDs, from which red light may be generated using a first LED and white light may be generated using a second LED.

The LEDs connected anti-parallel that are used for the pixels form a dipole or gate, wherein the direction of the voltage applied at the dipole or the direction of the current flowing through the dipole determines which LED generates light. If the LEDs have different colors, the color emitted is determined by the direction of the voltage or by the direction of the current. If different colors are to be generated using the pixels, the driver circuit must be able to control the direction of the current in the dipole. According to the prior art as disclosed in the cited documents, this is implemented using an H-bridge. The dipoles form the branches of H-bridges. The two series connections are formed from switches, in each case a first switch, which is a high-side switch, and a second switch, which is a low-side switch. The connecting points between the switches of the series connections are connected by way of the bridge arm, i.e., the LEDs connected anti-parallel. If the high-side switch of the first series connection and the low-side switch of the second series connection are closed simultaneously, a current flows in a first direction through the bridge arm, if, on the other hand, the high-side switch of the second series connection and the low-side switch of the first series connection are closed, a current flows in a second direction through the bridge arm.

Bridge circuits interconnected with the LEDs connected anti-parallel to form an LED pixel matrix in the bridge arm result in arrangements as disclosed, in particular, in the document U.S. Pat. No. 4,321,598A. FIG. 2 of the document U.S. Pat. No. 4,321,598A discloses an arrangement of the dipoles made up of the LEDs connected anti-parallel in a matrix having four rows and four columns. Each dipole is assigned to one row and one column. The dipoles of a row are connected with a first side at one of the series connections L1, L2, L3, L4 formed from a high-side switch 52 and a low-side switch 56 on the left side of the FIG. 2 of the document U.S. Pat. No. 4,321,598A, and the dipoles of a column are connected with a second side at one of the series connections R1, R2, R3, R4 formed from a high-side switch 52 and a low-side switch 56 on the right side of the FIG. 2 of the document U.S. Pat. No. 4,321,598A.

Control of the switches for adjusting the LEDs in the matrix disclosed in the document U.S. Pat. No. 4,321,598A is not possible using the same driver circuit, with which the adjusting is implemented in an LED matrix, in which no LEDs connected anti-parallel are provided. A driver circuit of an LED matrix having LEDs connected anti-parallel must be in the position of being able to control current in different directions. This is unknown in the case of the driver circuits for LED matrices, in which no LEDs connected anti-parallel are provided. In an LED pixel, therefore, it is not possible to use the same driver circuit in an LED matrix as in an LED matrix without LEDs connected anti-parallel.

SUMMARY OF THE INVENTION

The object of the present invention is to modify an arrangement of the aforementioned kind in such a way that at least parts of a driver circuit of an arrangement including an LED pixel matrix may be used without LEDs connected anti-parallel.

According to the invention, this object is achieved in that the arrangement includes for each row a driver circuit assigned to the row, wherein this driver circuit includes for each dipole of the row a first connection and a current adjustment circuit. Each of the dipoles of a row is connected with its second connection to the first connection assigned to the dipole of the driver circuit assigned to the row. In the driver circuit assigned to the row, a current is adjustable via one first current path each using each current adjustment circuit, wherein each first current path extends from the first connection of the arrangement via the first switch assigned to the row, via the first connection of one of the dipoles of the row, via the first LED of the dipole, via the second connection of the dipole to the first connection of the driver circuit assigned to the dipole. The arrangement also includes one current mirror per row, which has a first connection and a reference connection per each dipole of the row. Each of the dipoles of a row is connected with its second connection also to the first connection assigned to the dipole of the current mirror assigned to the row. Each reference connection assigned to a dipole of the current mirror assigned to the row is connected to the first connection of the LED driver circuit for the same dipole. A current is adjustable via a second current path using the current mirror for each dipole as a function of a signal at the reference connection assigned to the dipole, wherein each second current path extends from the second connection of the arrangement via the second switch assigned to the row, via the first connection of the dipole, via the second LED of the dipole, via the second connection of the dipole to the first connection of the current mirror assigned to the dipole.

While the current in the one direction through one of the dipoles is adjusted by the driver circuit, the current through the other direction through the dipole is adjusted by the current mirror as a function of the reference signal. The reference signals present at the reference connections may be reference currents, which flow via the reference connections of the current mirror.

The reference signals may be provided by the driver circuit. It is thus possible for the reference signals and, in particular, when reference currents are involved, to be adjusted by the driver circuit.

It is possible to configure an arrangement according to the invention in such a way that the reference currents flow from the first connection of the arrangement through the current mirror and via the reference connections of the current mirror, via the first connections of the LED driver into the LED driver and are adjustable in the LED driver by the current adjustment circuit.

The reference current, which is used for adjusting the current through the second LED of a dipole, may then be adjusted by the same current adjustment circuit as the current that flows through the first LED of the same dipole.

The current adjustment circuit may be controllable switches. These may then adjust the current through the first current path and optionally also the reference current for adjusting the current through the second current path. The current mirror may also include for each dipole a current adjustment circuit, which adjusts the current via the second path through this dipole as a function of the reference current assigned to the dipole. These current adjustment circuits may also be controllable switches.

The controllable switches may be activated using a pulse width-modulated signal (PWM signal) to adjust the currents via the first current paths, the reference currents and/or the currents via the second current paths.

The currents adjustable by the current mirror, which flow via the second current paths, may be the same as the reference currents or multiples of the reference currents. Thus, it is possible to operate the second LEDs of a dipole using a higher current than the first LEDs of the dipole. Different intensities of the LEDs, for example, may be implemented, in this way.

An arrangement according to the invention may include two controllable switches assigned to each dipole for decoupling or diodes for decoupling, wherein, using a first of these two switches for decoupling or a first of these diodes for decoupling, it is possible to decouple the second connection of the dipole from the first connection of the driver circuit assigned to the dipole and wherein, using a second of these two switches for decoupling or a second of these diodes for decoupling, it is possible to decouple the reference connection of the current mirror assigned to the dipole from the first connection of the driver circuit assigned to the dipole. These two switches for decoupling may be operated alternatingly. Alternatively, the first current path or the current path for the reference current may be connected with the aid of the two switches. The switches could also be replaced by a toggle switch.

All controllable switches of an arrangement according to the invention may be transistors or field effect transistors or other flow control valves.

An arrangement according to the invention may include a control. Control connections of the first switch for decoupling may be jointly connected via a first line to a connection of the control and control connections of the second connections [sic] switch for decoupling may be jointly connected via a second line to a connection of the control.

A control connection of the first switch may also be connected to the first line and a control connection of the second switch may also be connected to the second line.

The first connection of an arrangement according to the invention may be connected to a positive potential of a supply voltage and the second connection of the arrangement may be connected to a negative potential of a supply voltage, which may then form a ground potential of the arrangement. The driver circuit may be a low-side driver circuit. The current mirror may be a high-side current mirror.

The driver circuit and/or the current mirror may be integrated circuits. According to the invention, it may be provided that the driver circuits of all rows are implemented in a circuit, in particular, in an integrated circuit, and that the current mirrors of all rows are implemented in a circuit, in particular, in an integrated circuit.

BRIEF DESCRIPTION OF THE DRAWING

The invention is elucidated in more detail below with reference to the accompanying drawings. Wherein:

FIG. 1 shows a simplified diagram of the arrangement according to the invention.

DETAILED DESCRIPTION OF THE CURRENT EMBODIMENT

The arrangement according to the invention shown includes a matrix made up of LEDs 1, 2 connected antiparallel, which form the dipoles 1, 2. The matrix includes one row and three columns of these dipoles 1, 2. The dipoles have a first connection and a second connection.

The first connections of the dipoles 1, 2 of this row are connected to one another via a line. This line is connected to a node between two controllable switches 3, 4, namely, a first controllable switch 3 and a second controllable switch 4. These switches 3, 4 are assigned to this row.

A first connection of the first switch 3 is connected to a first connection ULED of the arrangement. A second connection of the first switch 3 is connected to the node. A first connection of the second switch 4 is connected to the node and a second connection of the second switch is connected to a second connection GND of the arrangement. A supply voltage drops between the first connection ULED and the second connection GND. The first switch 3 is a high-side switch and the second switch 4 is a low-side switch. The reverse, however, could also apply. It is in principle possible and it is also part of the invention that the supply voltage drops between the second connection and the first connection.

If further rows including dipoles were present, the first connections of the dipoles of each of these rows would be connected to one node each via one further line each between one further first switch each and one further second switch each, each of which are assigned to one row. The further first switches and the further second switches would then be connected similarly to the first switch shown and the second switch shown. Further columns including dipoles could also be present, which are connected as are already the dipoles of the columns shown.

The second connections of the dipoles 1, 2 of the row shown are connected via a first switch 5 for decoupling to one first connection Pix1, Pix2, Pix3 each of a driver circuit 7.

The driver circuit includes an adjustment circuit of a current for each dipole 1, 2 of the row shown, which flows through the dipole 1, 2 assigned to the adjustment circuit.

The second connections of the dipoles 1, 2 of the row shown are also connected to one first connection Pix1, Pix2, Pix3 each of a current mirror 8. The current mirror 8 has a reference connection Ref_Pix1, Ref_Pix2, Ref_Pix3 for each dipole 1, 2. For each dipole 1, 2 of the row shown, the current mirror 8 includes a circuit with adjustment circuit, which adjusts the current or a multiple thereof flowing through the reference connection Ref_Pix1, Ref_Pix2, Ref_Pix3 assigned to this dipole 1, 2, through the respective connection Pix1, Pix2, Pix3 of the current mirror 8 and which then flows through the dipole 1, 2, which is connected to the first connection Pix1, Pix2, Pix3 of the current mirror 8.

The reference connections Ref_Pix1, Ref_Pix2, Ref_Pix3 of the current mirror 8 are connected via one second switch 6 each for decoupling to one of the first connections Pix1, Pix2, Pix3 of the driver circuit 7. Specifically, each of the reference connections Ref_Pix1, Ref_Pix2, Ref_Pix3 of the current mirror 8 is connected to the first connection Pix1, Pix2, Pix3 of the driver circuit, which is assigned to the same dipole.

Control connections of the first switch 3 and of the first decoupling switch 5 are connected to a control connection RED and control connections of the second switch 4 and of the second decoupling switch 6 are connected to a control connection BLUE. The control connections RED and BLUE are connected to a control of the arrangement not shown.

To operate the first LED, the first switch 3 and the first decoupling switch 5 are closed and the second switch 4 and the second decoupling switch 6 are open. A current is then able to flow via first current paths from the first connection ULED of the arrangement, via the first switch 4, the line COM, the first connections of the dipoles 1, 2, the first LEDs 1 of the dipoles, the second connections of the dipoles 1, 2, the first decoupling switch 5, the first connections Pix1, Pix2, Pix3 of the driver circuit 7, the adjustment circuit in the driver circuit 7 to the second connection GND of the arrangement. In the process, the current flowing through each dipole 1, 2 may be adjusted by the adjustment circuit of the driver circuit 7 assigned to the dipole.

To operate the second LED 2, the first switch 3 and the first decoupling switch 5 are open and the second switch 4 and the second decoupling switch 6 are closed. A current is then able to flow via second current paths from the first connection ULED of the arrangement, via the adjustment circuit assigned to the second dipoles 1, 2 in the current mirror 8, the second connections of the dipoles 1, 2, the second LEDs, the first connections of the dipoles, the line COM, the second switch 4 to the second connection GND of the arrangement. In the process, the current flowing through each dipole 1, 2 may be adjusted by the adjustment circuit of the current mirror 8 assigned to the dipole. To adjust the adjustment circuit of the current mirror 8, a further current, the reference current, flows simultaneously for each dipole. The reference current flows via reference current paths from the first connection ULED into the current mirror, via the circuits that include adjustment circuit of the current mirror, the reference connections Ref_Pix1, Ref_Pix2, Ref_Pix3 of the current mirror 8, the second decoupling switch 6, the first connections Pix1, Pix2, Pix3 of the driver circuit 7 to the second connection GND of the arrangement. Each reference current is adjusted by the adjustment circuit of the driver circuit 7. The circuits of the current mirror 8 comprising the adjustment circuit of the current mirror 8 recognize the adjusted reference currents and the adjustment circuit of these circuits then adjust in accordance with the reference current the currents via the second current paths, with which the second LEDs 2 of the dipoles are supplied with current.

The driver circuit 7 is shown in FIG. 1 as a low-side driver and the current mirror 8 is shown as a high-side driver. If the supply voltage now drops between the second connection and the first connection, the driver circuit 7 then operates as a high-side driver and the current mirror 8 operates as a low-side driver.

The circuitry remains the same. The driver circuit may thus be selected as a high-side driver (normally for common cathodes of the LEDs) or as a low-side driver (normally for common anodes of the LEDs). Only the current mirror must correspond accordingly conversely thereto.

The advantage of these exemplary arrangements according to the invention is that a driver circuit may be used, which may also be used for arrangements that include an LED pixel matrix, which include no LEDs connected anti-parallel. Due to the use of the current mirror, it is also sufficient to use only one such driver circuit since, with the aid of the current mirror, it is possible to utilize both LEDs connected anti-parallel.

LIST OF REFERENCE NUMERALS 1 first LED
2 second LED
3 first switch
4 second switch
5 first decoupling switch
6 second decoupling switch
7 driver circuit
8 current mirror
ULED first connection of the arrangement
GND second connection of the arrangement
RED control connection
BLUE control connection
Pix1 first connection of the driver circuit, resp. of the current mirror
Pix2 first connection of the driver circuit, resp. of the current mirror
Pix3 first connection of the driver circuit, resp. of the current mirror
Ref_Pix1 reference connection of the current mirror
Ref_Pix2 reference connection of the current mirror
Ref_Pix3 reference connection of the current mirror
COM line between the first connection of the dipole and the first and second switch The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. An arrangement comprising:
an LED pixel matrix including a plurality of LED pixels; and
a driver circuit for controlling the LED pixel matrix;
wherein each of the plurality of LED pixels is formed from a dipole made up of two LEDs connected anti-parallel, including a first LED and a second LED;
wherein the LED pixel matrix includes at least one row and multiple columns of the dipoles forming the LED pixel;
wherein the dipoles of a row are connected with a first connection to a shared line;
wherein the shared line is connected to a node between a second connection of a first controllable switch assigned to the row and to a first connection of a second controllable switch assigned to the row;
wherein a first connection of the first switch assigned to the row is connected to a first connection of the arrangement;

wherein a second connection of the second switch assigned to the row is connected to a second connection of the arrangement;

wherein the arrangement includes a driver circuit assigned to the row, wherein this driver circuit includes for each dipole of the shared line a first connection; wherein each of the dipoles of the row is connected with its second connection to the first connection assigned to the dipole of the driver circuit assigned to the row;

wherein in the driver circuit assigned to the row, a current is adjustable with via one first current path, wherein each first current path extends from the first connection of the arrangement, via the first switch assigned to the row, via the first connection of one of the dipoles of the row, via the first LED of the dipole, via the second connection of the dipole to the first connection of the driver circuit assigned to the dipole;

wherein the arrangement also includes per row a current mirror, which has, per dipole each of the row, a first connection and a reference connection;

wherein each of the dipoles of a row is also connected with its second connection to the first connection assigned to the dipole of the current mirror assigned to the row;

each reference connection assigned to a dipole of the current mirror assigned to the line is connected with the first connection of the LED driver circuit for the same dipole; and a current is adjustable for each dipole using the current mirror via one second current path each as a function of a signal at the reference connection assigned to the dipole, wherein each second current path extends from the second connection of the arrangement, via the second switch assigned to the row, via the first connection of one of the dipoles of the row, via the second LED of the dipole, via the second connection of the dipole to the first connection assigned to the dipole of the current mirror.

2. The arrangement according to claim 1, wherein the signals present at the reference connections are reference currents which flow via the reference connections of the current mirror.

3. The arrangement according to claim 2, wherein the reference currents are adjusted by the driver circuit.

4. The arrangement according to claim 2, wherein the currents adjustable by the current mirror, which flow via the second current paths, are identical to the reference currents or multiples of the reference currents.

5. The arrangement according to claim 2, wherein the reference currents flow from the first connection of the arrangement through the current mirror and via the reference connections of the current mirror, via the connections of the LED driver into the LED driver, and are adjustable in the LED driver by the current adjustment circuit.

6. The arrangement according to claim 1, wherein the arrangement includes two controllable switches or diodes for decoupling assigned to each of the two dipoles, wherein, with a first switch of these switches or with a first diode of these diodes for decoupling, the second switch of the dipole is decouplable from the first connection of the driver circuit assigned to the dipole, and with a second switch of these switches or with a second diode of these diodes for decoupling, the reference connection of the current mirror assigned to the dipole is decouplable from the first connection of the driver circuit assigned to the dipole.

7. The arrangement according to claim 6, wherein the arrangement includes a control and that the control connections of the first switch for decoupling are jointly connected via a first line to the control and control connections of the second switch for decoupling are jointly connected via a second line to the control.

8. The arrangement according to claim 7, wherein a control connection of the first switch is also connected to the first line and that a control connection of the second switch is also connected to the second line.

9. The arrangement according to claim 1, wherein the first connection of the arrangement is connected to a positive potential of a supply voltage and the second connection is connected to a negative potential of a supply voltage, which forms a ground potential.

10. The arrangement according to claim 1, wherein the driver circuit is a low-side driver circuit.

11. The arrangement according to claim 1, wherein the driver circuit and/or the current mirror is/are an integrated circuit.

* * * * *